United States Patent Office 3,009,769
Patented Nov. 21, 196

3,009,769
METHOD OF PREPARING ZIRCONIUM-ALUMINUM-CHLORO COMPLEXES
Irvine W. Grote, Chattanooga, Tenn., assignor to The Chattanooga Medicine Company, Chattanooga, Tenn., a corporation of Tennessee
No Drawing. Filed June 2, 1960, Ser. No. 33,363
5 Claims. (Cl. 23—85)

The present invention is directed to the production of complexes of zirconium, aluminum and chlorine. These materials find particular use as astringents and more particularly for antiperspirant purposes.

Aluminum salts have been used extensively in antiperspirant compositions. Originally, these salts took the form of the aluminum salts of strong acids. These salts had the disadvantage of forming strongly acid solutions which had a tendency to irritate the skin and to damage the clothing. The use of less highly acidic salts of aluminum reduced the problems of skin irritation and clothing damage, but such compounds were relatively ineffective for the purpose of inhibiting perspiration.

More recently, it has been suggested that zirconium compounds be added to aluminum compounds for the purpose of modifying the action of the aluminum compounds in the composition. The zirconium compounds per se have antiperspirant activity but they also suffer from the drawback that they precipitated from solutions unless the solution was quite strongly acid.

Complexes of zirconium oxychloride and aluminum hydroxychloride are described in United States Patent No. 2,906,668 issued to Stewart M. Beekman on September 29, 1959. The process involved in that patent disclosure, however, has the drawback that it invariably results in the production of a gel which must be heated for substantial periods of time to convert the gel to a liquid.

Accordingly, an object of the present invention is to provide a new method for the preparation of complexes of zirconium, aluminum, and chlorine.

A further object of the invention is to provide an improved method for the preparation of the complexes which avoids the formation of the gel form throughout the synthesis.

Still another object of the invention is to provide a readily controllable method for the synthesis of complexes of zirconium, aluminum, and chlorine.

The complexes produced by the method of the present invention have the following empirical relationship between the zirconium, aluminum, and chloro contents:

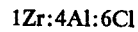

$1Zr:xAl:2+(0.5 \text{ or } 1.0)xCl$ where $x$ is an integer from 4 to 12.

In the method of the preesnt invention, zirconyl chloride, $ZrOCl_2$, is reacted with freshly precipitated aluminum hydroxide or with a material which will yield aluminum hydroxide in an aqueous medium together with added hydrochloric acid in the proper stoichiometric proportions to yield the desired complex. The material which results is always in the liquid stage, and evidences no tendency toward gel formation. This complex can be used, as such, or the remaining liquid constituents can be evaporated or distilled off, if desired.

The source of the aluminum hydroxide compound can be any of several choices. In one embodiment of the invention, the source of aluminum hydroxide compound is provided by an aluminum alkoxide, $Al(OR)_3$, where R is an alkyl group containing from 1 to 5 carbon atoms. Typically, the alkoxide may be aluminum isopropoxide or aluminum butyl alcoholate. When these alkoxides are present in the reaction medium, they hydrolyze, at least partially, to produce an aluminum hydroxy compound having at least one, and usually two hydroxy groups attached to the aluminum atom, the remaining valence( being satisfied by the alkoxy (OR) group(s).

In a modified form of the invention, the aluminu alcoholate may be first completely hydrolyzed to produ a suspension of aluminum hydroxide, and this fresh prepared hydroxide may be reacted with the zirconyl chl ride to produce the complex.

Another modification of the invention involves pr paring the freshly precipitated aluminum hydroxide fro inorganic sources by dissolving an aluminum salt, pre erably the chloride or nitrate in water, and adding sufficient amount of a basic compound such as ammoniu hydroxide until the aluminum hydroxide is precipitat as a finely divided suspension, separating the ammoniu chloride by centrifuging and washing, and recovering t relatively pure hydroxide.

In any of the embodiments discussed above, addition amounts of the chloride ion are furnished by addi hydrochloric acid to the combination of zirconyl chlori and the freshly precipitated aluminum hydroxide.

The following specific examples illustrate the prepar tion of various complexes through the use of the metho of the present invention.

*Example 1*

This procedure results in the production of a compl having the empirical relation:

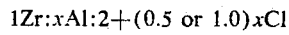

$1Zr:4Al:6Cl$

Two molecular proportions of aluminum isopropoxi were added with good agitation over a period of 5 minut to a solution containing ½ molecular proportion of zi conium oxychloride octahydrate and two molecular pr portions of hydrochloric acid dissolved in 1000 ml. water. At the end of the addition period, the temper ture was 67° C. Solution of the materials was substa tially complete. There was no trace of gel formatio The pH of a cooled sample was 3.3. The solution w distilled to remove the isopropyl alcohol which was by-product of the reaction. Enough alcohol and wat was removed so that the solution could be diluted to e actly 1 liter.

*Example 2*

The complex produced in Example 1 was also ma with an alternative procedure in which 2 moles of alun num isopropoxide were added with stirring to 1800 n of water with good agitation. The resulting aluminu hydroxide had a temperature of 50° C. A solution of 1 mole of zirconium oxychloride octahydrate and 2 mol of concentrated hydrochloric acid was prepared in 3( ml. of water and added with stirring to the aluminu hydroxide suspension. The resulting solution was stirre for five minutes and was quite fluid and slightly opale cent. No evidence of gel formation was noted. T cooled sample had a pH of 3.5. The solution was distill to remove the isopropyl alcohol which was the by-produ of the reaction. Enough alcohol and water was remov so that a solution could be diluted to exactly 2 liters.

*Example 3*

The complex produced by this example had the er pirical relationship:

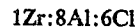

$1Zr:8Al:6Cl$

Two moles of aluminum isopropoxide were added wi good agitation over a period of five minutes to a sol tion of ¼ mole of zirconium oxychloride octahydra and 1 mole of concentrated hydrochloric acid dissolv in 1000 ml. of water. The temperature reached 62° There was no evidence of gel formation. The soluti was substantially complete, and the pH of a cooled sar ple was 3.45. The solution was distilled to remove isopropyl alcohol which formed in the reaction. Enough alcohol and water was removed so that the solution could be diluted to exactly 1 liter.

*Example 4*

The process of this example resulted in the formation of a complex having the empirical relation:

1Zr:8Al:10Cl

Two moles of aluminum isopropoxide were added with good agitation over a period of 5 minutes to a solution of ¼ mole of zirconium oxychloride octahydrate and 2 moles of concentrated hydrochloric acid in 1500 ml. of water. The temperature at the end of the addition time was 57° C. The solution was mixed another five minutes and produced a slightly opalescent, water-thin solution. The pH of a cooled sample was 3.3. There was no gel formation. The solution was distilled to remove the isopropyl alcohol which formed in the reaction. Enough alcohol and water was removed so that the solution could be diluted to exactly 1 liter.

*Example 5*

The complex of Example 4 was produced in the following manner. 1 mole of aluminum isopropoxide was added with good agitation to 1800 ml. of water. The resulting slurry had a temperature of 32° C. A solution of ⅛ mole of zirconium oxychloride octahydrate and 1 mole of concentrated hydrochloric acid in 200 ml. of water was added with stirring. The cloudy solution cleared on mixing. At the end of the addition time the temperature was 36° C. A cooled sample had a pH of 3.65.

The solution was distilled to remove isopropyl alcohol. Enough alcohol and water was removed so that the solution could be diluted to exactly 1 liter.

*Example 6*

The complex produced in this example bore the following relationship:

1Zr:12Al:14Cl

Two moles of aluminum isopropoxide were added with good agitation to 1500 ml. of water. The resulting slurry had a temperature of 49° C. A solution of ⅛ mole of zirconium oxychloride octahydrate and 2 moles of concentrated hydrochloric acid in 250 ml. of water was added with stirring. The temperature at the end of the addition time was 53° C. An additional five minute mixing period gave a practically clear, water-thin liquid. The pH of a cooled sample was 3.27. The solution was distilled to remove the isopropyl alcohol which formed during the reaction. Enough alcohol and water was removed so that the solution could be diluted to two liters.

*Example 7*

The process of this example yielded a complex having the relationship:

1Zr:12Al:8Cl

Two moles of aluminum isopropoxide were added with good agitation over a period of five minutes to a solution of ⅛ mole of zirconium oxychloride octahydrate and 1 mole of concentrated hydrochloric acid in 1000 ml. of water. At the end of the addition period the temperature was 61° C. The solution was stirred five minutes and solution was substantially complete. There was no tendency to gel. The pH of a cooled sample measured 3.55. The solution was distilled to remove isopropyl alcohol which formed during the reaction. It was then diluted to give a volume of 1 liter.

*Example 8*

The complex of Example 7 was also prepared in the following manner.

Two moles of aluminum isopropoxide were added with stirring to 1500 ml. of water. A solution of ⅛ mole of zirconium oxychloride octahydrate and one mole of concentrated hydrochloric acid in 150 ml. of water was added to the aluminum hydroxide slurry. A temperature of 51° C. was obtained at the end of the addition. Mixing was continued for twenty minutes and a water-thin solution resulted. The solution was distilled to remove the isopropyl alcohol which resulted from the reaction. The solution was cooled and diluted to two liters.

As indicated previously, the freshly precipitated aluminum hydroxide may also be derived from inorganic materials. A suitable procedure for this variation is given in the following example.

*Example 9*

Aluminum hydroxide was prepared by adding 0.2 gram moles of aluminum chloride hexahydrate to 400 ml. of cold water and precipitating the aluminum hydroxide by adding a slight excess of 5 N ammonium hydroxide slowly with stirring. The aluminum hydroxide was centrifuged and 200 ml. of liquid removed. This liquid was replaced with 200 ml. of water and reslurried and again centrifuged. This process was repeated and another 200 ml. of liquid was removed and replaced. The aluminum hydroxide slurry was again centrifuged and 200 ml. of water removed. The aluminum hydroxide thus prepared could then be reacted with the proper proportions of zirconium oxychloride and hydrochloric acid to produce complexes of the type described in the preceding examples.

It is believed that the complexes of the present invention contain aluminum atoms bonded to zirconium through an oxygen atom. Thus, the complex produced in Example 1 could be shown as:

$$Zr \cdot (AlO)_4 Cl_6 (OH)_2$$

From the foregoing, it will be appreciated that the methods of the present invention provided readily controllable processes for the production of the zirconium-aluminum-chloride complexes without the formation of gels during the complexing reaction. No additional heat is required to carry out the reaction, since it is slightly exothermic and operation at room temperature is quite adequate.

It will also be evident that various modifications can be made to the discussed embodiments without departing from the scope of the present invention. For example, a part or all of the zirconium content may be replaced by hafnium.

This invention is a continuation-in-part of my co-pending applications Serial No. 819,808, filed June 12, 1959, and Serial No. 665,658, filed June 14, 1957.

I claim as my invention:

1. The method of preparing zirconium-aluminum-chloro complexes selected from the group consisting of:

$$Zr(AlO)_x Cl_{2+\frac{x}{2}}(OH)_n$$

and $$Zr(AlO)_x Cl_{2+x}(OH)_n$$

the aluminum atoms in said complexes being bonded to the zirconium through oxygen atoms, $x$ being an integer from 4 to 12 and $n$ being a number of OH groups sufficient to satisfy the remaining valences of the aluminum atoms present that are not already satisfied by the Cl groups which comprises reacting a finely divided suspension of an aluminum hydroxy compound in an aqueous medium with zirconyl chloride, in the proportion of at least 4 moles of aluminum to 1 mole of zirconyl chloride, adding sufficient hydrochloric acid to said medium to provide the required Cl content, and then recovering the complex thus produced.

2. The method of claim 1 in which said zirconyl chloride is reacted in said aqueous medium with the hydrolysis product of an aluminum alkoxide containing from 1 to 5 carbon atoms in each of its alkoxide groups.

3. The method of claim 1 in which said zirconyl chloride is reacted with the hydrolysis product of aluminum isopropoxide.

4. The method of claim 1 in which said zirconyl chloride is reacted with aluminum hydroxide resulting from the reaction of an aluminum salt with a basic compound.

5. A zirconium-aluminum-chloro complex selected from the group consisting of:

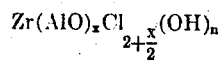

and

the aluminum atoms in said complexes being bonded the zirconium through oxygen atoms, $x$ is an integer fr( 4 to 12, and $n$ is a number of OH groups sufficient satisfy the remaining valences of the aluminum ato present that are not already satisfied by Cl groups.

References Cited in the file of this patent

UNITED STATES PATENTS

| | | |
|---|---|---|
| 2,196,016 | Huehn et al. | Apr. 12, 19 |
| 2,687,423 | Mesirow | Aug. 24, 19 |
| 2,814,584 | Daley | Nov. 26, 19 |
| 2,854,382 | Grad | Sept. 30, 19 |
| 2,906,668 | Beekman | Sept. 29, 19 |